(12) United States Patent
DeWitt et al.

(10) Patent No.: US 7,904,912 B2
(45) Date of Patent: Mar. 8, 2011

(54) ADAPTIVE PROCESSOR UTILIZATION REPORTING HANDLING DIFFERENT PROCESSOR FREQUENCIES

(75) Inventors: Jimmie Earl DeWitt, Georgetown, TX (US); Frank Eliot Levine, Austin, TX (US); Enio Manuel Pineda, Austin, TX (US); Robert John Urquhart, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1586 days.

(21) Appl. No.: 11/214,576

(22) Filed: Aug. 30, 2005

(65) Prior Publication Data

US 2007/0061108 A1 Mar. 15, 2007

(51) Int. Cl.
*G06F 15/00* (2006.01)
*G06F 9/44* (2006.01)
*G06F 9/45* (2006.01)

(52) U.S. Cl. .................. 719/318; 717/130; 702/186

(58) Field of Classification Search .................. 719/318; 717/130
See application file for complete search history.

(56) References Cited

U.S. PATENT DOCUMENTS

| | | | |
|---|---|---|---|
| 6,560,647 B1 * | 5/2003 | Hafez et al. | 709/224 |
| 6,768,433 B1 | 7/2004 | Toth et al. | |
| 7,239,980 B2 | 7/2007 | DeWitt et al. | |
| 2004/0059545 A1 * | 3/2004 | Sun | 702/186 |
| 2004/0161062 A1 | 8/2004 | Richey et al. | |
| 2005/0138484 A1 | 6/2005 | Moyer et al. | |
| 2005/0149929 A1 * | 7/2005 | Srinivasan et al. | 718/100 |
| 2006/0047987 A1 * | 3/2006 | Prabhakaran et al. | 713/322 |

* cited by examiner

*Primary Examiner* — Li B Zhen
(74) *Attorney, Agent, or Firm* — Yee & Associates, P.C.; David A. Mims, Jr.

(57) ABSTRACT

A computer implemented method, apparatus, and computer usable code for identifying processor utilization. A current event is detected. A number of elapsed cycles for a processor since a previous event are identified in response to detecting the current event. An elapsed time using the number of elapsed cycles and a current frequency of the processor is calculated, wherein the elapsed time is used to identify the processor utilization.

3 Claims, 4 Drawing Sheets

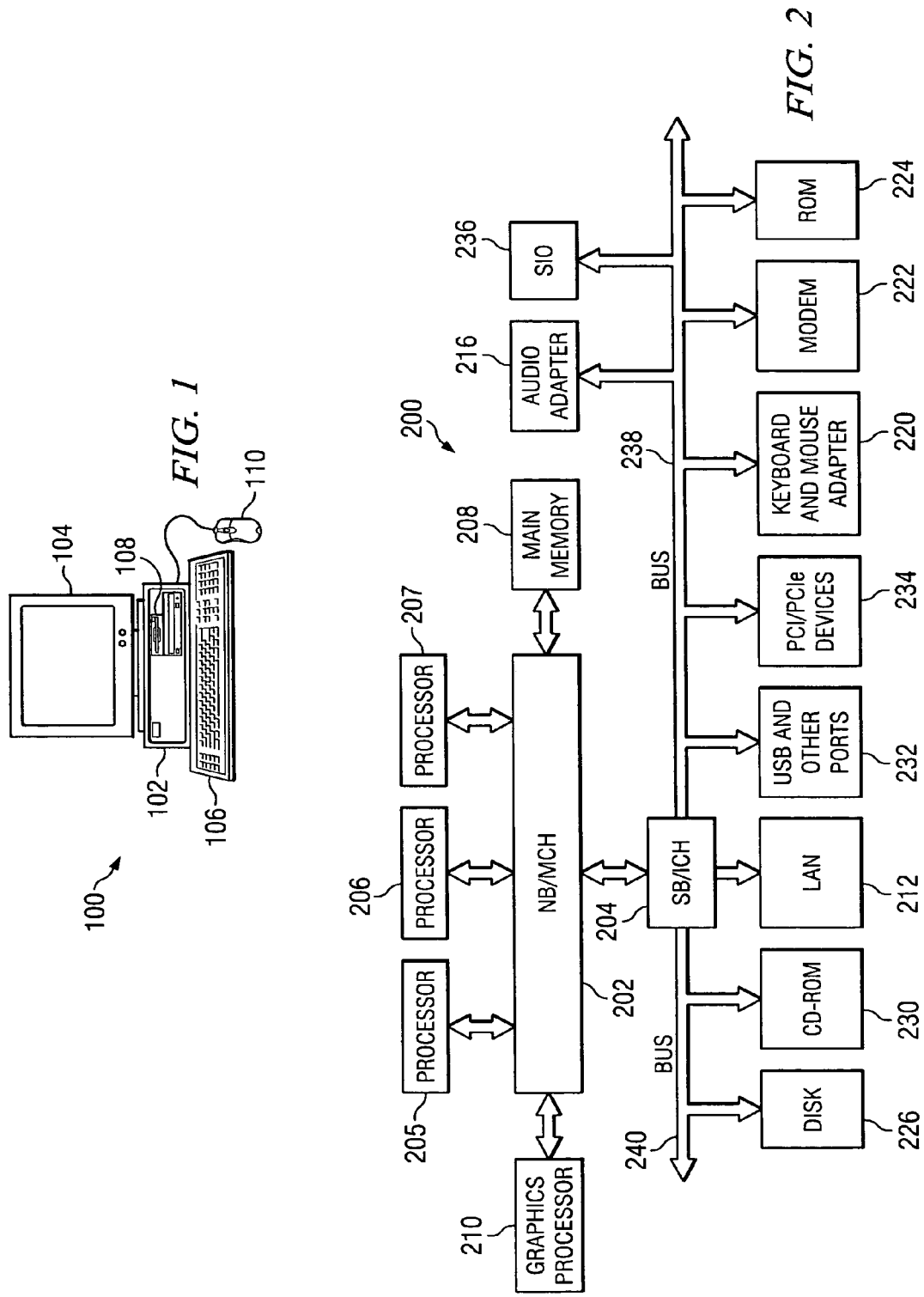

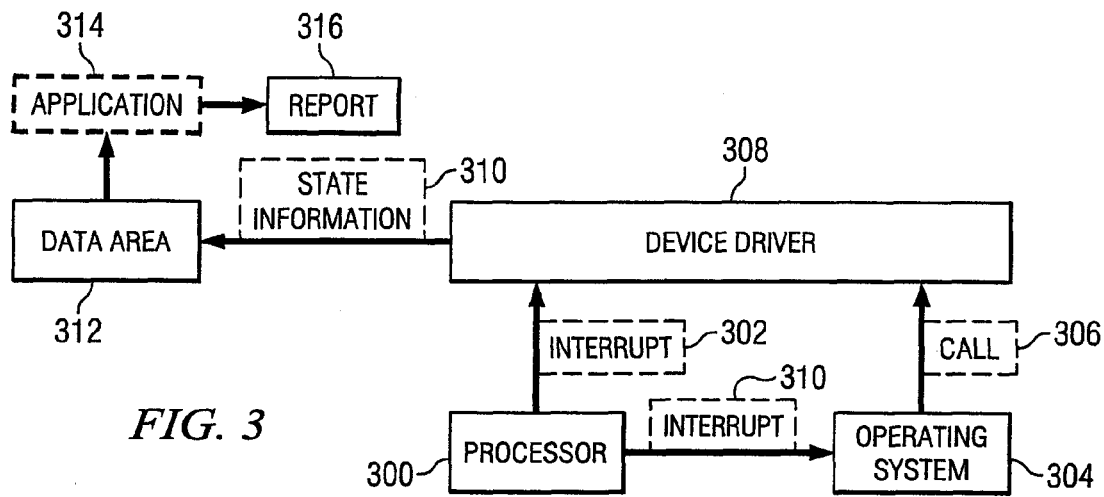
FIG. 3
| PREVIOUS EVENT | CURRENT EVENT | | | | 400 |
|---|---|---|---|---|---|
| | DISP | DISPLDLE | IntrStart | IntrEnd | |
| DISP | BUSY | BUSY | BUSY | BUSY | |
| DISPLDLE | IDLE | IDLE | IDLE | IDLE | |
| IntrStart | INTR | INTR | INTR | INTR | |
| IntrEnd | BUSY | BUSY | BUSY | BUSY | |
FIG. 4
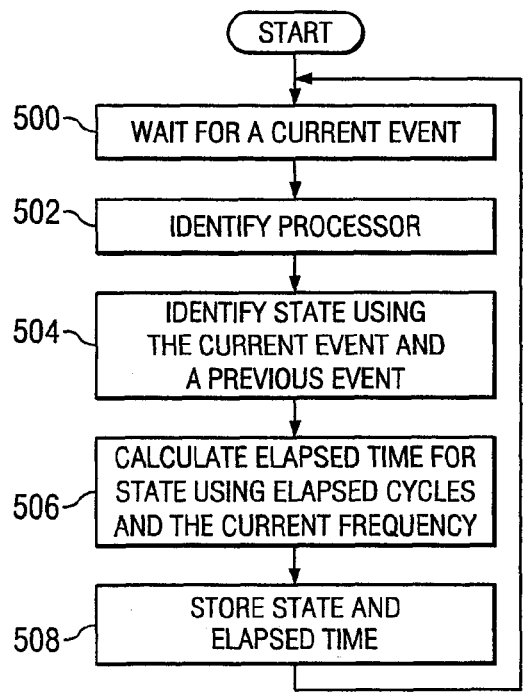
FIG. 5

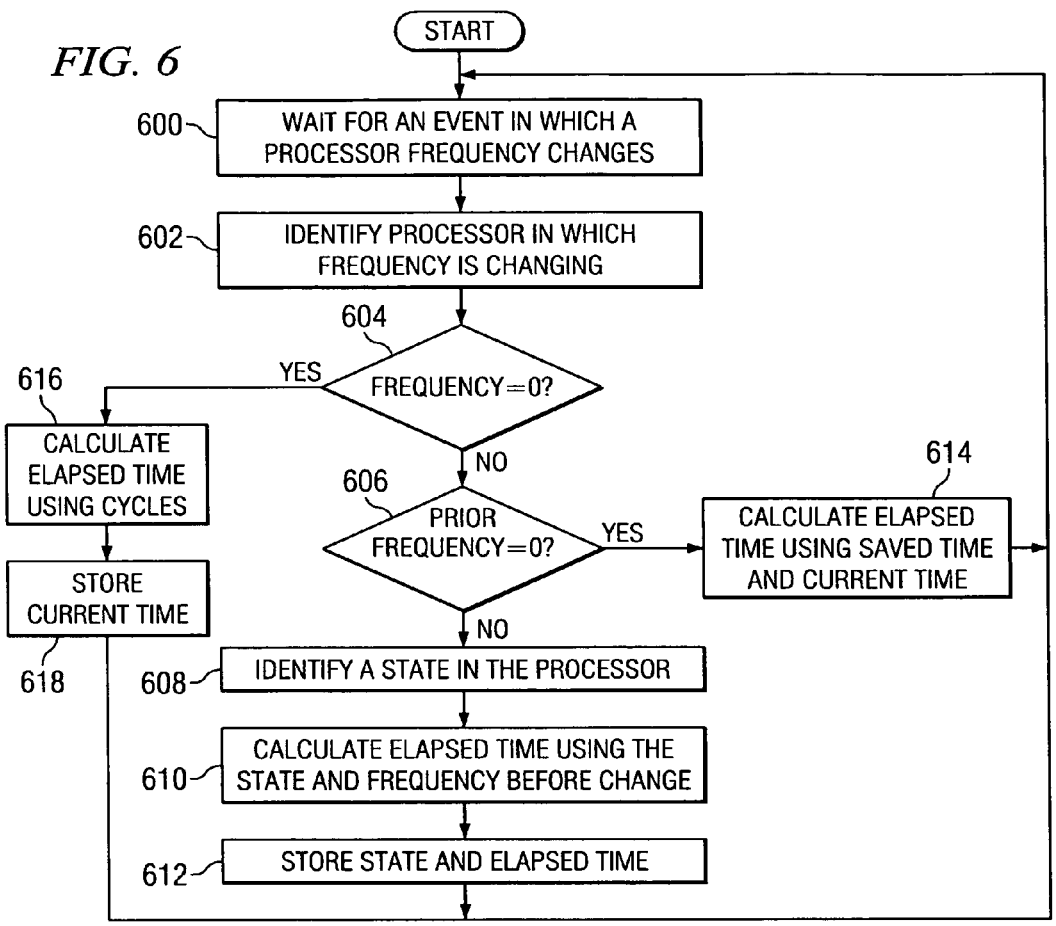
FIG. 6
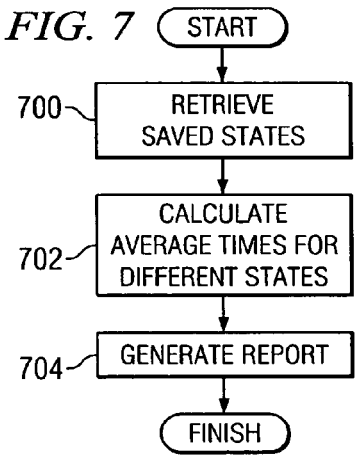
FIG. 7
FIG. 8
```
C:\tools\bin>swtrace ai
**      Processors: 1
**      Sample interval: 1 Second(s)
**      Number of samples: infinite (until stopped via Ctrl-c)
**      Data collection started on 06/30/2005 at 12:47:18.328
**
idle: 97.26% busy: 2.69% intr: 0.05%
idle: 97.33% busy: 2.62% intr: 0.05%
idle: 97.27% busy: 2.68% intr: 0.05%
idle: 97.37% busy: 2.58% intr: 0.05%
idle: 97.40% busy: 2.55% intr: 0.05%
idle: 97.44% busy: 2.51% intr: 0.06%
```
800

ADAPTIVE PROCESSOR UTILIZATION REPORTING HANDLING DIFFERENT PROCESSOR FREQUENCIES

BACKGROUND OF THE INVENTION

1. Field of the Invention

The present invention relates generally to an improved data processing system and in particular, to a method, apparatus, and computer usable code for determining processor utilization. Still more particularly, the present invention relates to a method, apparatus, and computer usable code for determining processor utilization when processor frequencies change.

2. Description of the Related Art

In order to reduce heat and power consumption, a data processing system may change the frequency of one or more processors. Alternatively, different processors in the same data processing system may have different fixed frequencies. The dynamic frequency changes may be caused by a variety of reasons. For example, a detection of overheating or excessive power consumption may cause a reduction in frequency in one or more processors. Additionally, a desire to reduce power consumption in a portable data processing system, such as a laptop, is another reason for changing frequencies based on usage. Other conditions also may cause changes in processor frequencies. For example, changes in processor frequencies may be based upon information about an application. For example, having knowledge that an application has a large number of cache misses may cause a change of processor frequency to reduce those cache misses.

Current performance tools used to identify the amount of time a processor is idle measures and reports processor utilization in which relative times during which a processor is busy, idle, or interrupt state is identified through cycles spent in each state for each processor. Further, if different processors have different frequencies, the use of cycles to identify the times during which different states occur also may become misleading.

SUMMARY OF THE INVENTION

The present invention provides a computer implemented method, apparatus, and computer usable code for identifying processor utilization. For each current event detected or state change, a number of elapsed cycles for a processor since a previous event are identified in response to detecting the current event. An elapsed time using the number of elapsed cycles and a current frequency of the processor is calculated, wherein the elapsed time is used to identify the processor utilization.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of a data processing system in which the aspects of the present invention may be implemented;

FIG. 2 is a block diagram of a data processing system in which aspects of the present invention may be implemented;

FIG. 3 is a block diagram illustrating components used in identifying processor utilization with different processor frequencies in accordance with an illustrative embodiment of the present invention;

FIG. 4 is a table used to identify processor states in accordance with an illustrative embodiment of the present invention;

FIG. 5 is a flowchart of a process for storing state and elapsed time information in accordance with an illustrative embodiment of the present invention;

FIG. 6 is a flowchart of a process for handling frequency changes in a processor in accordance with an illustrative embodiment of the present invention;

FIG. 7 is a flowchart of a process for generating reports in accordance with an illustrative embodiment of the present invention;

FIG. 8 is a diagram illustrating an example report of processor utilization in accordance with an illustrative embodiment of the present invention.

DETAILED DESCRIPTION OF THE PREFERRED EMBODIMENT

Figure 9:
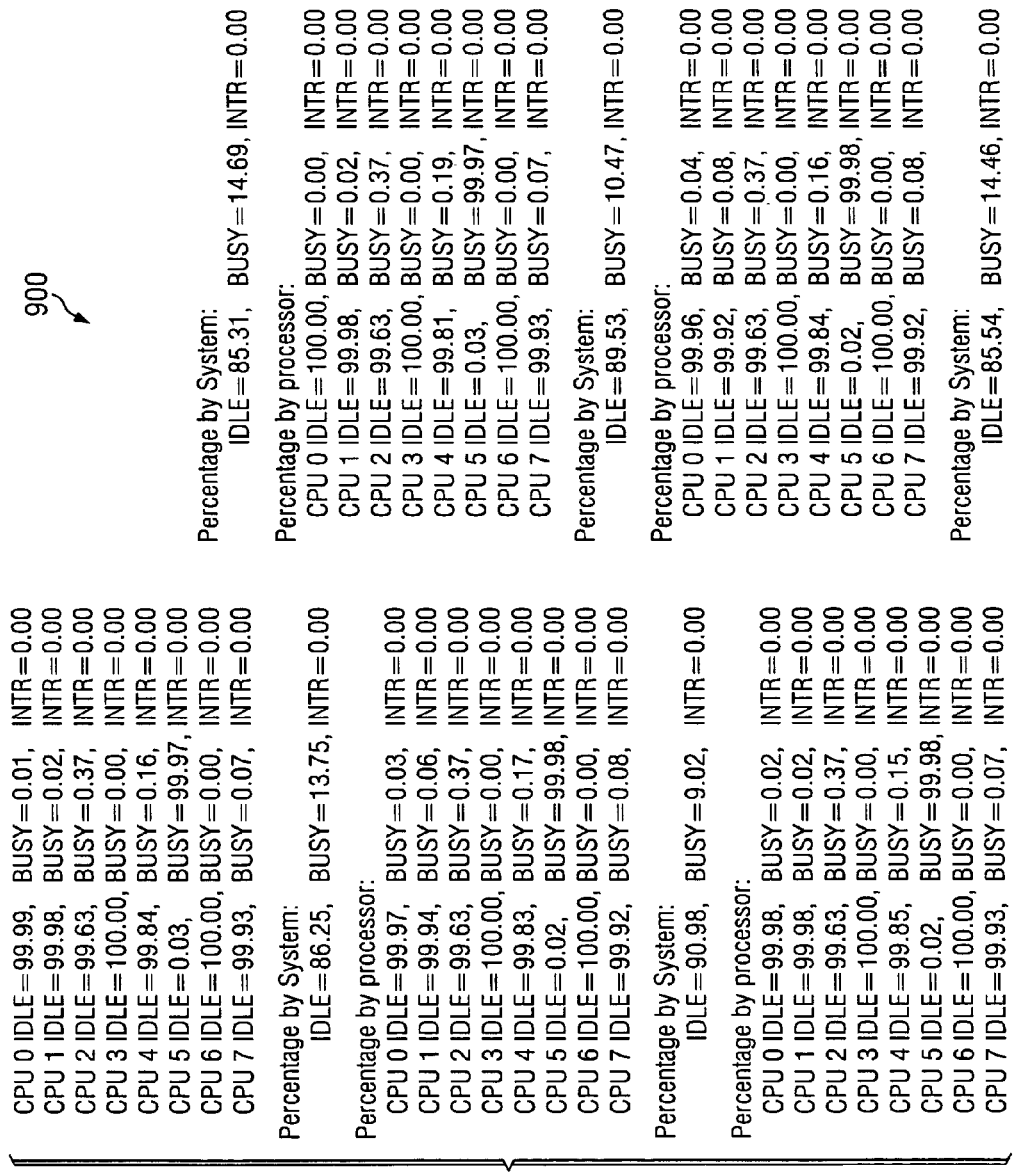
FIG. 9 is a diagram illustrating an example report for multiple processors in a symmetric multi-processor data processing system in accordance with an illustrative embodiment of the present invention.

With reference now to the figures and in particular with reference to FIG. 1, a pictorial representation of a data processing system in which the aspects of the present invention may be implemented. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

With reference now to FIG. 2, a block diagram of a data processing system is shown in which aspects of the present invention may be implemented. Data processing system 200 is an example of a computer, such as computer 100 in FIG. 1, in which code or instructions implementing the processes of the present invention may be located. In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are connected to north bridge and memory controller hub 202. Graphics processor 210 may be connected to the MCH through an accelerated graphics port (AGP), for example.

In the depicted example, local area network (LAN) adapter 212 connects to south bridge and I/O controller hub 204 and audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the present invention are performed by processor 206 using computer implemented instructions, which may be located in a memory such as, for example, main memory 208, read only memory 224, or in one or more peripheral devices.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The aspects of the present invention provide a computer implemented method, apparatus, and computer usable program code for capturing and associating events relative to other events when the frequency of one or more processors in a data processing system changes during the monitoring of the processor utilization. In the illustrative examples, the aspects of the present invention provide for identifying processor utilization. When a current event is detected, a number of elapsed cycles since a last or previous event are identified for a processor. The elapsed time is calculated using the number of elapsed cycles and a current frequency of the processor. This elapsed time is associated or applied to a state of the processor to generate a sum for use in identifying processor utilization. These different processor states include, for example, busy, idle, or in an interrupt state.

With reference now to FIG. 3, a block diagram illustrating components used in identifying processor utilization with different processor frequencies is depicted in accordance with an illustrative embodiment of the present invention. In this depicted example, the components are examples of hardware and software components found in a data processing system, such as data processing system 200 in FIG. 2.

Processor 300 generates interrupt 302, and operating system 304 generates call 306. The interrupt and call are identified and processed by device driver 308. In these examples, the call is generated by a presently used operating system dispatcher in operating system 304. This dispatcher is hooked or modified to generate a call to device driver 308 when an event occurs. When call 306 is received from operating system 304, device driver 308 determines whether the dispatch is directed to an idle process or thread or to a process or thread that is not idle. Device driver 300 updates state information for the processor, performs accumulation for the previous state, and returns control back to the operating system dispatch routine. Device driver saves state information 310 in data area 312.

In a similar manner, each time an interrupt is received by device driver 308, state information 310 is generated and saved into data area 312. State information 310 along with other state information stored in data area 312 that may be analyzed at a later time. The state information stored in data area 312 is analyzed by application 314 to generate report 316. Application 314 may retrieve state information from data area 312 periodically, such as once per second. In these illustrative examples, report 316 presents processor utilization for the data processing system. The processor utilization may be presented in the terms of percentages of time during which the processor is in different states.

Device driver 308 receives interrupt 304 and 306 through hooks in these examples. A hook is a break point or call out that is used to call an outside routine or function for additional processing, such as computing utilization sums as in these examples. In particular, an interrupt vector table may be modified to direct the interrupts to device driver 308. These modifications to interrupt vector tables are well known to those who are skilled in the art.

Device driver 308 generates utilization information for various processes being executed through processor 300 in operating system 302. The interrupts are used to indicate that utilization information should be summed. The different aspects of the present invention identify the elapsed time when an event occurs through multiplying the number of the elapsed cycles from the last events until the current events by the current frequency of the processor. These events include changes in processor frequencies. This elapsed time is applied or associated with a current state of the processor.

In these illustrative examples, the current state of the processor is identified by comparing the current event with the previous event. Each event is indicated by an interrupt, such as interrupt 304, or interrupt 306.

Turning now to FIG. 4, a table used to identify processor states is depicted in accordance with an illustrative embodiment of the present invention. In this example, table 400 illustrates states implemented in a state machine to identify the current state of the processor. In these examples, table 400 is implemented in a software process, such as device driver 308 for identifying states of a processor, such as processor 300 in FIG. 3. A previous event is compared to the current event to identify the state of the processor. The different events in this example are Disp, which is a dispatch. DispIdle is a dispatch idle. IntrStart is an interrupt start, while IntrEnd is an interrupt end. The different states shown in table 400 are busy, idle, and interrupt (Intr). These different states are used to identify and report on processor utilization within a data processing system.

The frequency of the processors in the data processing system are identified at the beginning of each run or analysis. Interrupts also are received when frequencies change and the different frequencies of each processor are used to calculate the elapsed time for purposes such as generating reports, such as report 316 in FIG. 3.

At each dispatch, interrupt entry, interrupt exit, and frequency change, the elapsed cycles occurring since the last event on the processor are identified. These elapsed cycles are multiplied by the current frequency to determine the elapsed time to be applied to the correct state for the processor. Then, if the event is a new frequency, the processor frequency is set such that events are always multiplied by the same frequency.

With reference now to FIG. 5, a flowchart of a process for storing state and elapsed time information is depicted in accordance with an illustrative embodiment of the present invention. The process depicted in FIG. 5 may be implemented in a process such as that found in device driver 308 in FIG. 3.

The process begins by waiting for a current event to occur (step 500). Events are identified through interrupts received by device drivers in these examples. When a current event occurs, the process identifies the processor for which the event had occurred (step 502). Then, the process identifies the state of the processor using the current event and a previous event for the processor (step 504). In these examples, the state is identified using a state machine with the states, such as those illustrated in table 400 in FIG. 4. An elapsed time is calculated for the state using the elapsed cycles that have occurred between the previous event and the current event and a current frequency for the processor (step 506). Specifically, the number of elapsed cycles are multiplied by the current frequency to identify the amount of elapsed time. Thereafter, the state of the processor and the elapsed time are stored as state information (step 508) with the process then returning to step 500. The process illustrated in FIG. 5 is repeated for each processor within the data processing system.

Turning now to FIG. 6, a flowchart of a process for handling frequency changes in a processor is depicted in accordance with an illustrative embodiment of the present invention. The flowchart in FIG. 6 illustrates a process that may be implemented in a software component, such as device driver 308 in FIG. 3.

The process begins by waiting for an event in which the processor frequency changes (step 600). In these examples, this event is identified by an interrupt received by the device driver. Next, the process identifies the processor in which the frequency is changing (step 602). Typically, the operating system has made the determination that the processor frequency is about to change and the operating system makes a call out to a registered routine to indicate the frequency change, where the frequency is available as a parameter passed to the registered routine. Alternatively, the hardware may detect a condition which causes it to signal an interrupt that indicates it is about to change the processor frequency or turn off the processor. In this case, the hardware provides an interface to determine the new frequency. A determination is made as to whether the frequency of the process is changing to zero (step 604). If the frequency is not changing to zero, a determination is then made as to whether the prior frequency was equal to zero (step 606). If the prior frequency is not zero, a state in the processor is identified (step 608). This state is identified using the state machine with states such as those illustrated in table 400 in FIG. 4. Next, elapsed time is calculated using the state and the frequency for the change if frequency is to occur (step 610). The state and the elapsed time is accumulated against the previous state.

With reference to step 604, if the frequency is changing to zero, this means the processor is being stopped to conserve power. As a result, no elapsed cycles will occur until the frequency changes back to a frequency other than zero. The elapsed time is calculated using cycles that have already occurred (step 616). The elapsed time is accumulated against the previous state. Additionally, the current time is stored (step 618). This current time may be in the form of an actual date and time, rather than a number of elapsed cycles. This current time may be retrieved from various sources, such as the system clock for the processor. The process then returns to step 600.

With reference again to step 606, if the prior frequency is zero, the elapsed time is calculated using the save time and current time (step 618). In step 618, the save time is the time stored in step 616 as described above.

With reference now to FIG. 7, a flowchart of a process for generating reports is depicted in accordance with an illustrative embodiment of the present invention. The process illustrated in FIG. 7 may be implemented in a software component such as application 314 in FIG. 3. This process is employed to generate reports identifying processor utilization.

The process begins by periodically retrieving or accessing saved state information accumulated by the device driver (step 700). These average times are presented as percentages of the entire time that the sample was taken to generate the state information (step 702). The report is then generated (step 704) with the process terminating thereafter.

Turning now to FIG. 8, a diagram illustrating an example report of processor utilization is depicted in accordance with an illustrative embodiment of the present invention. In this example, report 800 is for a data processing system having a single processor in which the sample interval is one sample per second. Report 800 identifies idle time, busy time, and interrupt time for different processors.

Turning now to FIG. 9, a diagram of a report for multiple processors in a symmetric muti-processor data processing system is depicted in accordance with an illustrative embodiment of the present invention. In this example, report 900 shows usage for eight processors.

Thus, the different aspects of the present invention provide a computer implemented method, apparatus, and computer usable code for associating events with time stamps and for accumulating state information. The different aspects of the present invention take into account processor frequency changes so that the ordering and associating of time can be accurately performed. The different examples use the number of elapsed cycles and multiply those elapsed cycles by the current frequency of a processor for which an event had occurred to identify the elapsed time.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for identifying processor utilization, the computer implemented method comprising:
    detecting a current event, wherein the event is indicated using an interrupt, wherein the interrupt is one of a processor generated interrupt and an operating system generated interrupt;
    responsive to detecting the current event, identifying a number of elapsed cycles for a processor since a previous event;
    further responsive to detecting the current event, identifying a state of the processor using the current event and the previous event;
    responsive to detecting the current event being a change of the current frequency of the processor to zero, storing a current time to form a stored time;
    calculating an elapsed time using the number of elapsed cycles and a current frequency of the processor, wherein responsive to detecting the current event being a change of the current frequency of the processor from zero to a new frequency, calculating the elapsed time using the stored time and the current time wherein the elapsed time is used to identify the processor utilization; and
    associating the state with the elapsed time.

2. A computer program product comprising:
    computer usable storage medium including computer usable program code stored thereon for identifying processor utilization, said computer usable program code comprising:
    computer usable program code for detecting a current event, wherein the event is indicated using an interrupt, wherein the interrupt is one of a processor generated interrupt and an operating system generated interrupt;
    computer usable program code, responsive to detecting the current event, for identifying a number of elapsed cycles for a processor since a previous event;
    computer usable program code, further responsive to detecting the current event, for identifying a state of the processor using the current event and the previous event;
    computer usable program code, responsive to detecting the current event being a change of the current frequency of the processor to zero, for storing a current time to form a stored time;
    computer usable program code for calculating an elapsed time using the number of elapsed cycles and a current frequency of the processor, and calculating the elapsed time using the stored time and the current time responsive to detecting the current event being a change of the current frequency of the processor from zero to a new frequency, wherein the elapsed time is used to identify the processor utilization; and
    computer usable program code for associating the state with the elapsed time.

3. A data processing system comprising:
    a bus;
    a communications unit connected to the bus;
    a memory connected to the bus, wherein the storage device includes a set of computer usable program code; and
    a processor unit connected to the bus, wherein the processor unit executes the set of computer usable program code to detect a current event, wherein the event is indicated using an interrupt, wherein the interrupt is one of a processor generated interrupt and an operating system generated interrupt; identifies a number of elapsed cycles for a processor since a previous event in response to detecting the current event; identifies a state of the processor using the current event and the previous event further in response to detecting the current event; storing a current time to form a stored time in response to detecting the current event being a change of the current frequency of the processor to zero; calculates an elapsed time using the number of elapsed cycles and a current frequency of the processor, and calculates the elapsed time using the stored time and the current time in response to detecting the current event being a change of the current frequency of the processor from zero to a new frequency, wherein the elapsed time is used to identify the processor utilization; and associates the state with the elapsed time.

* * * * *